US010951430B2

(12) United States Patent
Fahrendorff et al.

(10) Patent No.: US 10,951,430 B2
(45) Date of Patent: Mar. 16, 2021

(54) ELECTRONIC COLLABORATION AND COMMUNICATION METHOD AND SYSTEM

(71) Applicant: Mitel Networks Corporation, Ottawa (CA)

(72) Inventors: Anders Fahrendorff, Ottawa (CA); Ian Murchison, Ottawa (CA); Logendra Naidoo, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/358,536

(22) Filed: Mar. 19, 2019

(65) Prior Publication Data

US 2019/0288863 A1 Sep. 19, 2019

Related U.S. Application Data

(60) Provisional application No. 62/761,362, filed on Mar. 19, 2018.

(51) Int. Cl.
*H04L 12/18* (2006.01)
*G06F 3/01* (2006.01)
*H04W 12/06* (2021.01)

(52) U.S. Cl.
CPC .......... *H04L 12/1822* (2013.01); *G06F 3/017* (2013.01); *H04L 12/1818* (2013.01); *H04W 12/06* (2013.01)

(58) Field of Classification Search
CPC . H04L 12/1822; H04L 12/1818; G06F 3/017; H04W 12/06
USPC .......................................................... 709/204
See application file for complete search history.

(56) References Cited

U.S. PATENT DOCUMENTS

| | | | | |
|---|---|---|---|---|
| 2014/0267577 | A1* | 9/2014 | Weber | H04L 12/1822 348/14.09 |
| 2015/0169069 | A1* | 6/2015 | Lo | G06F 3/011 715/753 |
| 2016/0309532 | A1* | 10/2016 | Yu | H04W 4/21 |
| 2019/0007227 | A1* | 1/2019 | Ferreira | H04L 67/16 |

FOREIGN PATENT DOCUMENTS

| | | |
|---|---|---|
| EP | 3293969 A1 | 3/2018 |
| WO | WO 2017/171750 A1 | 10/2017 |

* cited by examiner

*Primary Examiner* — Glenford J Madamba (57) ABSTRACT

An electronic communication method and system are disclosed. Exemplary methods include using the second communication device, determining a presence of a first communication device, based on the step of determining the presence of the first communication device, using a cloud service, connecting the first communication device to the electronic communication, and using the cloud service, connecting the second communication device to the electronic communication. Exemplary methods and systems can provide a way to automatically extract meeting access information and seamlessly launch and/or log a user/participant into an electronic communication.

20 Claims, 5 Drawing Sheets

1. Open meeting - Closed hand to open hand

1. End meeting – Open hand to closed hand

1. Volume up – Clockwise turn movement

2. Volume down – Counter clockwise turn movement

3. Mute – Open hand movement from high to low

1. Un-mute – open hand movement from low to high

FIG. 5

ELECTRONIC COLLABORATION AND COMMUNICATION METHOD AND SYSTEM

CROSS-REFERENCE TO RELATED APPLICATIONS

This application claims the benefit of U.S. Provisional Application Ser. No. 62/761,362, entitled "Contrivance for Effortless Collaboration and Communication," filed Mar. 19, 2018, the contents of which are hereby incorporated herein by reference to the extent the contents do not conflict with the present disclosure.

FIELD OF INVENTION

The present disclosure generally relates to electronic communication methods and systems. More particularly, the disclosure relates to methods and systems suitable for collaborative electronic communications.

BACKGROUND

Traditionally, network-based conference services rely on a user or participant to provide credentials to initiate or join an electronic communication, such as a conference call. The user may have a communiqué, such as a calendar invitation or an email, with a meeting identification (or hyperlink), a meeting passcode, and sometimes even an additional personal passcode, to further identify the participant as a trusted user who is pre-verified to initiate or participate in, for example, a secure meeting. Initiating or joining such electronic communications is often a labor-intensive process, often requiring a user to locate instructions for joining the electronic communication and the credentials to register with a meeting service or a conference call as a trusted user, and then entering such information using a device.

Cell phones are becoming more and more sophisticated and are used to do more than just make phone calls, take pictures, and run apps. A portable device (such as the common mobile phone) can be used as a security implement in situations where a separate user-verification process can be implemented, for example, by entering a passcode, scanning a barcode within an application to identify the user or leveraging thumbprint, voiceprint, or facial recognition technology to supplement the traditional identification methods, such as showing or scanning physical cards, badges, or the like.

Generally, users prefer the path of least resistance when it comes to interacting with electronic devices. A good example is a touch screen device, which doesn't emphasize the use of a computer mouse or keyboard to scroll, and which can be used to select and/or type actions when navigating an application thereon. An ability of a user to just touch the commands or icons they desire is an example of aiming for sound interface design, like good writing, which requires rhetorical awareness. However, such interactions are generally lacking for initiating and/or participating in electronic communications.

Accordingly, improved methods and systems that allow a user to initiate and/or join electronic communications, such as network-based conference services, are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The present disclosure relates generally to electronic communication methods and systems. Exemplary electronic communication methods and systems can be used to, for example, commission an electronic communication, such as a conference call, a video call, a chat session, a meeting or conference, or a collaboration session, such as a conference call or online meeting. Exemplary methods and systems enable secure conference services that can connect one or more devices to another device, such as a conference hub, for the purposes of, for example, allowing collaboration of users in a meeting setting. The meeting may occur with one or more participants in a room and/or with one or more participants at various geographically dispersed locations.

As set forth in more detail below, exemplary methods and systems disclosed herein can provide a way to automatically extract meeting access information and seamlessly launch and/or log a user/participant into an electronic communication. For example, exemplary systems and methods can autonomously provide user access credentials, such as a meeting/conference designation, such as a unique number or a hyperlink, in combination with a passcode or a set of passcodes.

Exemplary methods and systems can allow a user to start an electronic communication using a default method, such as a conference bridge, and automatically connect (e.g., dial up) intended participants. In this case, systems and methods can use contact information for each participant that can be extracted from an email or other source to facilitate contacting/inviting each participant in a particular thread. An example of this includes initiating the electronic communication, as described in more detail below, and greeting each invited participant (e.g., from the email or calendar invitation) with a recording, SMS message, or the like. The message could include, for example, "an urgent meeting with <add name> has been requested. Press 1 to enter the conference call or 2 to respond with a message."

Figure 1:
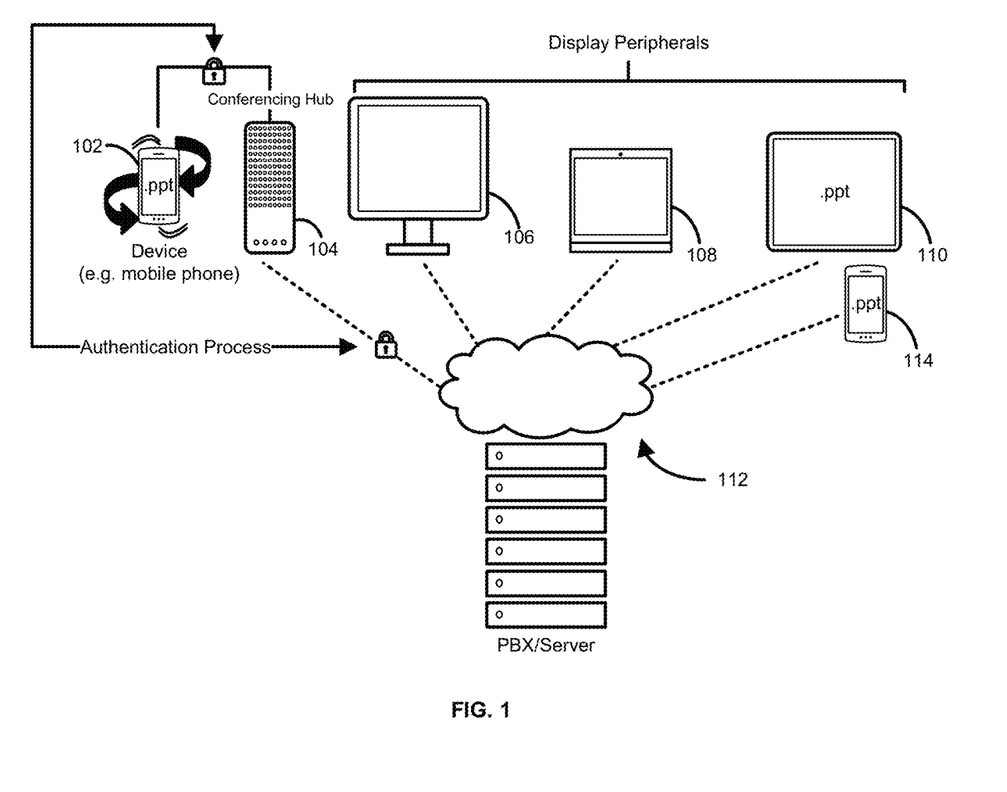
FIG. 1 illustrates an electronic communication system in accordance with various exemplary embodiments of the disclosure.

Turning now to the figures, FIG. 1 illustrates an electronic communication system 100 in accordance with exemplary embodiments of the disclosure. Electronic communication system 100 includes a first communication device 102, a second communication device 104, a cloud service or server 112, and can also include one or more peripheral devices 106-110 and/or one or more other devices 114. System 100 can be used to allow a user to quickly initiate or join an electronic communication and access related features and information, without having to manually enter meeting information and/or one or more passcodes.

First communication device 102 can include any suitable electronic device, such as a smart phone, a tablet computer, a personal computer, a work station, or any other device that includes a user interface to allow a user to perform one or more tasks as described herein. First communication device 102 can include one or more microphones, one or more speakers, and include one or more wireless communication devices, such as a mobile communication device, a WiFi device, a Bluetooth beacon device, an NFC communication device, an infrared device, an ultrasound device, or the like. As set forth in more detail below, first communication device 102 can connect to cloud service/server 112 using a first wireless technology (e.g., using a mobile telephone network) and can couple directly to second communication device 104 using one or more second wireless technologies.

First communication device 102 includes a communication application that performs various functions described herein. Upon the first communication device 102 receiving a signal from the second communication device 104, as described in more detail below, the application can cause user credentials, meeting information, and/or one or more passcodes to be sent to cloud service 112. The information can include a location of the first communication device 102 and/or an identification of the second communication device 104, which allows the cloud service to send second communication device 104 a request to join the electronic communication.

Second communication device 104 can include a conference device or hub. As illustrated in FIG. 1, second communication device 104 can be coupled to one or more peripheral devices 106-110, directly or using cloud service 112. Second communication device 104 can include one or more microphones, one or more speakers, and include one or more wireless communication devices, such as a mobile communication device, a WiFi device, a Bluetooth beacon device, an NFC communication device, an infrared device, an ultrasound device, 6LowPAN or ZigBee or the like. As set forth in more detail below, second communication device 104 can determine a presence of the first communication device, using, for example, a short-range communication protocol, such as WiFi, a Bluetooth beacon, near field communication (NFC), infrared, ultrasound, or the like, and automatically send a signal to the first communication device 102 based on the detection of the presence of the first communication device 104.

Second communication device 104 can also include gesture-recognition features and devices, such as sensors (e.g., cameras or radar sensors) that monitor the movement of another (e.g., the first) electronic communication device and/or human movement. In some cases, detecting gestures can use technology that recognizes motion in an electronic communication device and then transmit that information using one or more wireless connection protocols. In this case, a communication link can be established or maintained between the first communication device and second communication device and/or the cloud service to transmit the information corresponding to the gestures.

Additionally or alternatively, gesture-recognition devices can be remotely positioned away from the second communication device 104, so that participants can utilize gestures further away from second communication device 104. This system could be used in, for example, a large room and reduce a desire for users to be positioned closer the second communication device 104.

Cloud service 112 can include one or more servers. By way of particular example, cloud service 112 can be or include a private branch exchange (PBX) server. Cloud service 112 can be used to authenticate participants, initiate an electronic communication with the first communication device 102 and the second communication device 104, and provide other communication services. For example, upon receiving a notification, such as a notification from the first communication device 102, cloud service 112 can send an invitation to an electronic communication to the first communication device 102 and the second communication device 104. In response to the meeting request, cloud service 112 can also receive user and/or device credentials and authenticable devices and/or users.

Peripheral devices 106-110 can include various devices, such as monitors or displays, speakers, televisions, projectors, cameras, microphones, and the like. Peripheral devices 106-110 can be coupled—either wired or wirelessly—to second communication device 104 and/or wired or wirelessly to cloud service 112.

Exemplary electronic communication methods include providing a first communication device having an application stored thereon, providing a second communication device, using the second communication device, determining a presence of the first communication device, based on the step of determining the presence of the first communication device, using a cloud service, connecting the first communication device to the electronic communication, and using the cloud service, connecting the second communication device to the electronic communication. Exemplary methods can also include a step of authenticating a user of the first communication device, gesture recognition, and other steps described herein.

Figure 4:
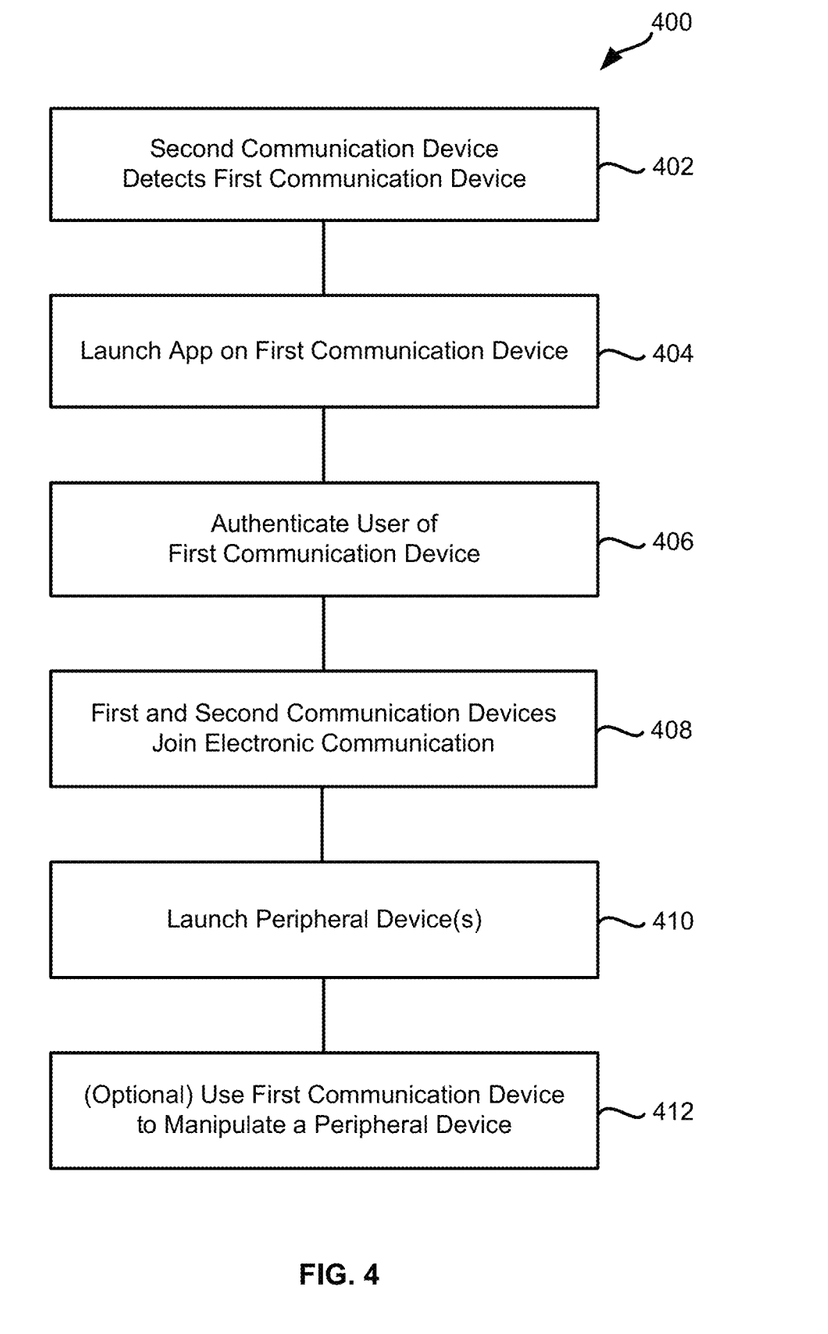
FIG. 4 illustrates an electronic communication method in accordance with exemplary embodiments of the disclosure.

FIG. 4 illustrates an electronic communication method 400 in accordance with exemplary embodiments of the disclosure. Electronic communication method 400 includes the steps of a second communication device detecting (e.g., determining a presence of) a first communication device (step 402), launching an application on the first communication device (step 404), authenticating a user of the first communication device (step 406), first and second electronic devices joining the electronic communication (step 408), optionally launching peripheral devices (step 410), and optionally using the first communication device (or human gestures) to manipulate a peripheral device (step 412).

During step 402, a second communication device, such as second communication device 104, detects a presence of a first communication device, such as first communication device 102. Second communication device 104 can detect the presence of first communication device 102 using, for example, one or more of short-range protocols, such as WiFi, a Bluetooth beacon, NFC, infrared, ultrasound, 6LowPAN or ZigBee or the like. For example, a user can walk into a meeting room with the second communication device and optionally one or more peripheral devices, such as peripheral device 106-110, and the user can place the first communication device within, for example, a predefined distance of the second communication device to allow the second communication device to detect the first communication device. By way of example, the second communication device can sniff for and/or ping the first communication device to initiate a pairing between the first communication device and the second communication device.

During step 404, when a first communication device receives a signal (e.g., ping, pairing, or confirmation of pairing) from a second communication device, an application, such as the application described above, can launch. If the first communication device is unlocked, the application on the first communication device can automatically launch and thereby initiate authentication of the first communication device and a corresponding user for the electronic communication. By unlocking the first communication device, a user is authenticated with that communication device, and user information for authenticating the user for the electronic communication can be sent from the first communication device to a cloud service (e.g., cloud service 112). If, on the other hand, the first communication device is locked when the first communication device receives a signal from the second communication device, the user can be prompted to unlock the device to thereby launch the application and send credentials to the cloud to authenticate the user.

Once the application is launched, a user and/or user device (e.g., first communication device 102) is authenticated with the cloud service 112. The authentication can occur as part of a communication (e.g., call or meeting) setup or the like, wherein user credentials or metadata indicative thereof are sent from the first communication device to the cloud service. By way of example, a user can use a first communication device to register with the cloud service, and the cloud service can store first device information, such as phone number, International Mobile Equipment Identity or IMEI, or other identifying information, which can allow automatic authentication of the first communication device, and, if the first communication device is unlocked, of the user.

Exemplary electronic communication devices, such as cell phones, are well suited in facilitating unified communications, for example, when setting up conference calls, sharing files, or multimedia content, etc. Data protection is also offered by most portable communication devices, such as smartphones, and in some cases adds another level of security to prevent unauthorized use of the phone or the apps running on the device.

In one embodiment of the disclosure, the electronic systems and methods leverage the availability of personal data that are stored on the portable communications device to enable user-authentication methods by using such data (or metadata indicative thereof) to verify the user's identity. The personal portable device (for communication purposes or otherwise) can be a representation of the user's identity to authorize the user when performing various collaboration related features or functions, such as joining a conference call or online-meeting. User authentication in conjunction with the user's electronic communication device is also possible by relying on stored profiles on, for example, a cloud service, such as a server connected to a PBX in the cloud. As mentioned previously, the user-data (or metadata associated therewith or indicative thereof) on a personal device, such as a portable phone, can be cross-referenced with the data on the cloud service/server and successful matches can result in an authenticated user when such a process is either run independently or in conjunction with an alternate layer of authentication such as biometric data or the phone's IMEI designation.

Mobile phone devices are generally used as a means of communication; therefore, the storage of personal data is fairly standard. For this reason, there is a multitude of user-data that can be leveraged during the authentication process when verifying a user. Data that is unique to the phone, such as the IMEI designation, a set of contacts with recognizable data profiles, and/or a combination of applications in a user's application directory are all examples of unique options that can be used to verify the user's identity for authentication.

In another embodiment, the authentication process can use a determination of the user's identity through, for example, thumbprint, voiceprint, or facial recognition technology or biometric data gathered by, for example, the first communication device. If the phone verifies the user and transmits the data to the cloud service, and there is a match for that profile stored, the user can be authenticated.

An exemplification of the technique to use data on the user's portable device to authenticate can depend on an initial establishment of a trust relationship. Trust can be created by the same communication device that compares a data-point, for example, the device's serial number, or IMEI number (designated by the manufacturer), to the data stored in the cloud service. The server running the authentication process can retain these data-points for later verification, and positive matches during the authentication process ensure the phone and/or user are authenticated and the cloud service can then authorize authenticated access to the electronic communication.

Once authentication is complete, the second communication device can receive an invitation to the electronic communication and automatically join the electronic communication upon receipt of the invitation (step 408). If not already connected to the electronic communication, the first communication device and/or other communication devices associated with users invited to the meeting can automatically receive a meeting invitation.

In accordance with examples of the disclosure, step 408 can include authentication of the user of the first communication device, if an electronic communication (e.g., meeting) is scheduled, the cloud service will check the user's calendar and automatically launch the communication/meeting based on the calendar invite information. If the meeting is not scheduled, the cloud service can create an ad hoc meeting, prompt the user to reserve the room the user is currently in, if available, and can also allow the user to manually copy the meeting information to share with others via invite, email, text, or the like and/or can prompt the user to enter contact information for others to join the electronic communication—either as authenticated or as non-authenticated participants. Alternatively, such information can be automatically sent to the other participants—e.g., using text, email, calendar invite, or the like.

As or once the second communication device joins the electronic communication, any peripheral devices (e.g., peripheral devices 106-110) can be launched and be ready for use (step 410). For example, one or more displays can automatically launch and automatically display a list of invited participants and/or a list of invited participants that have not yet joined the electronic communication.

During the electronic communication, participants can share content from the first communication device or another communication device (e.g., communication device 114). In accordance with exemplary aspects, one or more participants can use the application on the communication device to control what is being displayed in the room and/or in the cloud meeting. For example, the communication devices can be linked to the electronic communication and share content using cloud service 112—e.g., through a direct (e.g., wireless) connection with cloud service 112. Additionally or alternatively, a user can use an electronic communication device to directly (e.g., wirelessly, such as using short-range technology) communicate with the second electronic communication device and/or one or more of the peripheral devices (step 412) to control or adjust a function parameter of one or more of the second communication device and a peripheral device coupled to the second communication device. For example, using the application on a communication device, a user can perform one or more of: initiating another communication, muting the electronic communication (e.g., by muting speakers on the second electronic communication device and/or one or more peripheral devices), unmuting the electronic communication, adjusting display settings, adjusting a speaker volume of the second communication device and/or peripheral device(s), pushing content to the peripheral device, and annotating content in the cloud service and displayed on the peripheral device. In other words, a first communication protocol can be used to communicate between an electronic device and the cloud service and a second communication protocol can be used to communicate between the electronic device and the second communication device and/or peripheral device(s).

In some cases, the function parameters of the second electronic device and/or peripheral device(s) can be manipulated or adjusted using gestures. The gestures can be recognized by the second communication device and/or by transmitting information from an electronic device to the cloud service, wherein the information includes device movement information.

Figure 5:
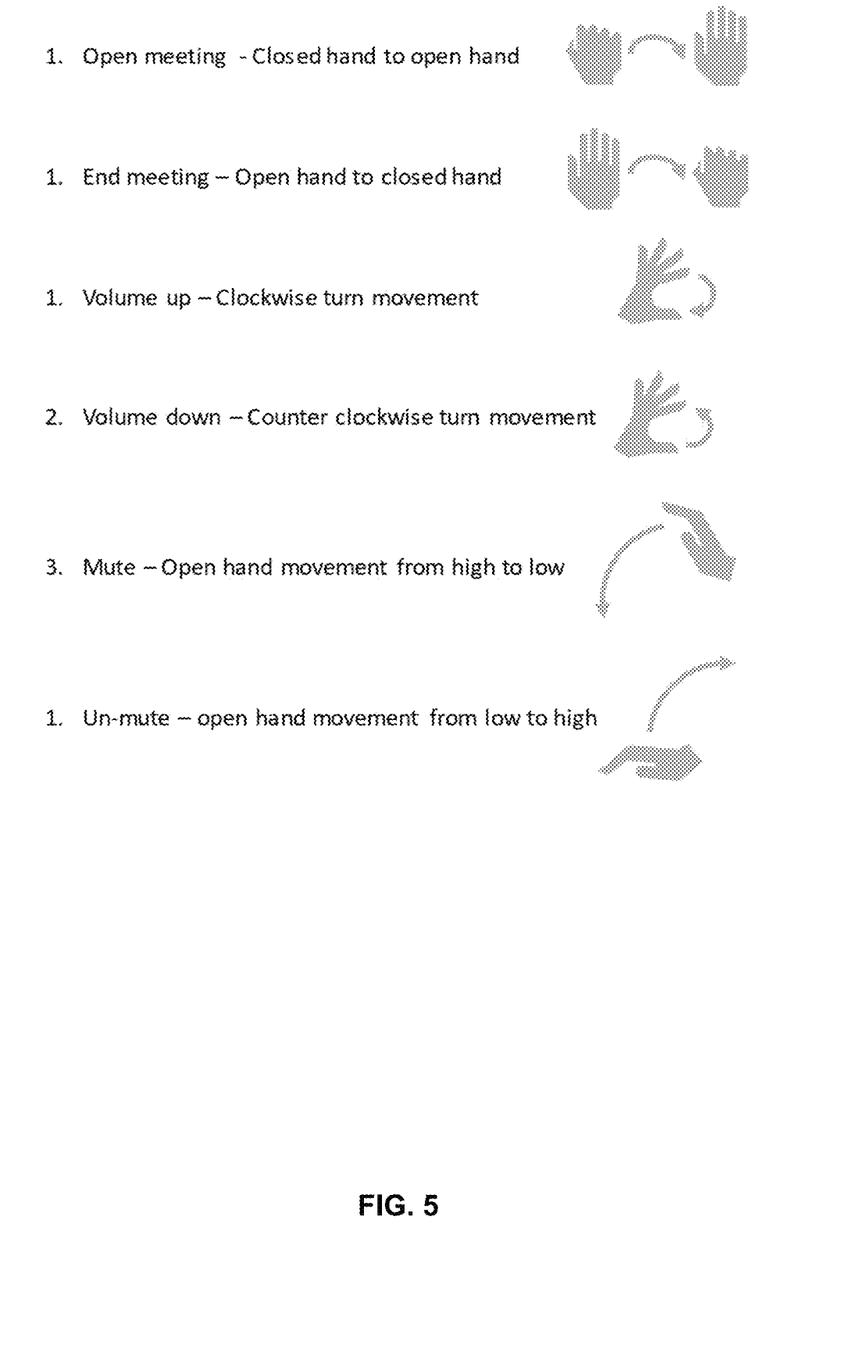
FIG. 5 illustrates exemplary gestures suitable for use with exemplary embodiments of the disclosure.

For example, users of electronic communication devices can use various forms of gesturing (such as waving a device in a particular manner) to perform specific functions that may include, but are not limited to, adjusting speaker volume of the second communication device, adding other participants that are trusted by an already authenticated user, pushing content to participants within the conference facility (by means of display device paired with the conference-hub facility), or to participants that are logged into the meeting on-line. When content is being shared, the portable device can also be used through gesturing (and possibly an optional keyboard interface for text input) to manipulate the content such as annotating slide-content with text, or controlling multimedia content (stop, start, pause, volume level, etc.). Alternatively, second communication device and/or other remote devices can be configured to recognize human gesturing. FIG. 5 illustrates exemplary hand gestures that can be used in accordance with examples of the disclosure.

Figure 2:
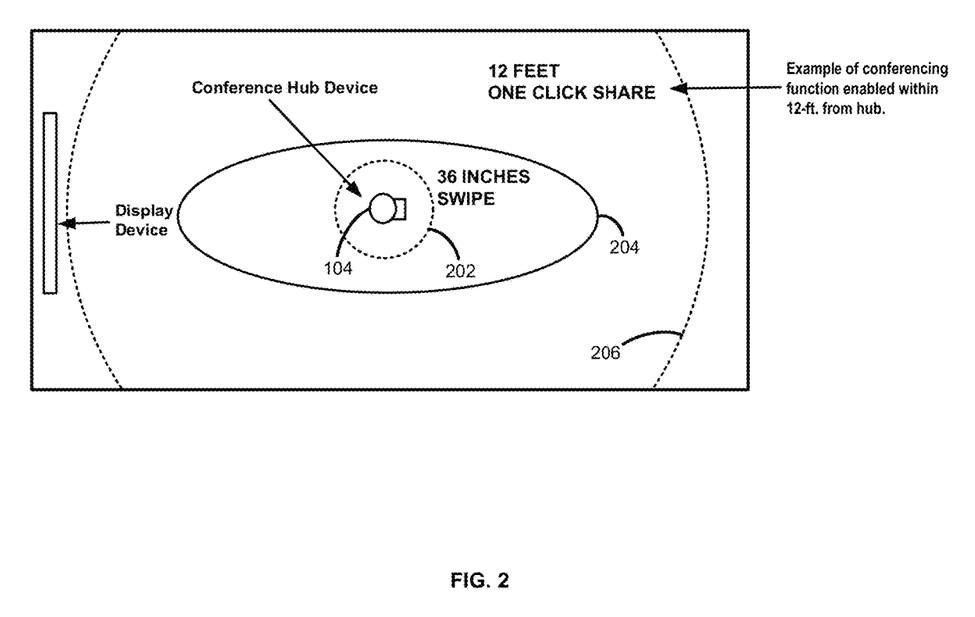
FIG. 2 illustrates a system, including zones, in accordance with additional exemplary embodiments of the disclosure.
Figure 3:
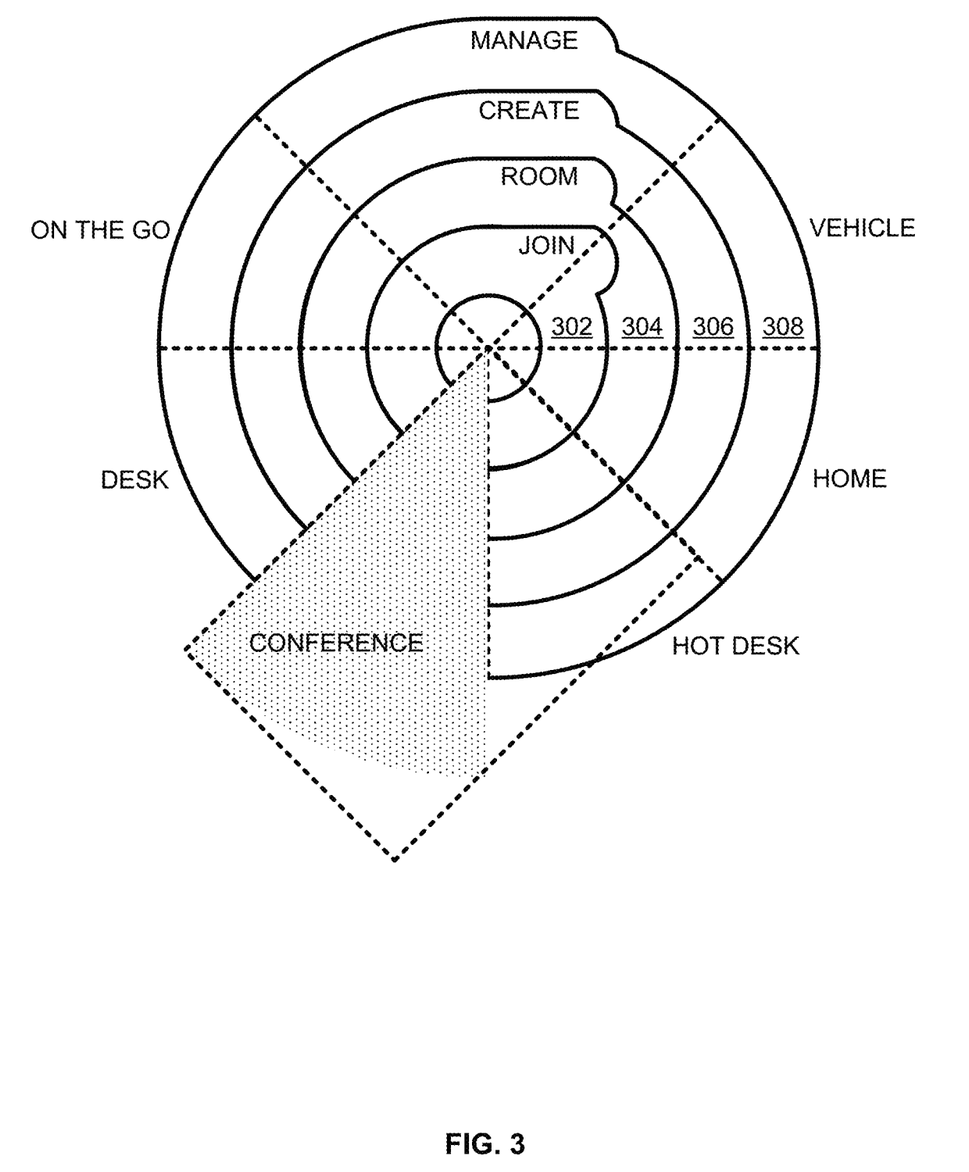
FIG. 3 illustrates zones in accordance with exemplary embodiments of the disclosure.

FIGS. 2 and 3 illustrate zones that can be used in accordance with exemplary methods and systems described herein. The zones can be, for example, demarcated within a conference facility or room or other area to limit or allow certain meeting functions (e.g., only) within a zone or within a zone closer to the second communication device. The first communication device can be programmed to perform specific functions if the first communication device is within, for example, a defined area (e.g., zone 202 or 302) that is proximate to the second communication device. For example, a first communication device placed within a few centimeters above the second communication device, could automatically authorize the user to join or start the meeting.

A space that is larger (e.g., zone 204 or 304) can be used to allow participants to share content in the meeting without being authenticated by the cloud service, provided such user is in the defined zone. Additional zones 206, 306, 308 may be employed if, for example, certain collaboration related features or functions are designed to work depending on how close the user with the portable device is to the conference-hub device. This might encourage meeting participants to move closer to second communication device 104. Zones can be defined by, for example, a (e.g., short-range communication) signal strength between a first communication device and a second communication device.

In accordance with further examples of the disclosure, authentication requirements could be configured for each user, so in some scenarios, a common collaboration area could be set up with a device to administrate the meeting or share/view content. Furthermore, the authentication requirements could be configured to pre-authorize a common device (in a common conference room), so that gesturing could be used to interact with the conference-hub facility. Therefore, if a meeting is not scheduled and a user walks into the meeting room, they could "swipe" (e.g., place in proximity to a second communication device) their device and the communication system could indicate the conference room's availability without an authentication required, unless the user requested a conference/meeting be started. A further exemplification of this scenario might require the user to initiate a new conference call/meeting from the application, the cloud service could start an electronic communication between communication devices and show the conference-room location as booked.

In yet another example of the disclosure, a second communication device can detect other users that are proximate to the second communication device and the system can cause to be displayed, e.g., on respective communication devices and/or on peripheral devices, said participants, without said participants having to join the meeting as authenticated participants.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. For example, although steps of methods are listed in a particular order, the steps need not be performed in the illustrated order and some steps may be performed simultaneously. These and other changes or modifications are intended to be included within the scope of the present invention, as expressed in the following claims.

We claim:

1. An electronic communication method comprising the steps of:
   providing a first communication device having an application stored thereon;
   providing a second communication device;
   using the second communication device, determining a presence of the first communication device;
   based on the step of determining the presence of the first communication device, automatically sending a signal from the second communication device to the first communication device;
   upon receiving the signal from the second communication device, causing the first communication device to send a meeting information directly to a cloud service, the meeting information allows the cloud service to send the second communication device a request to join an electronic communication; and using the cloud service, (i) connecting the first communication device to the electronic communication, (ii) sending the second communication device the request to join the electronic communication, and (iii) connecting the second communication device to the electronic communication.

2. The method of claim 1, further comprising a step of authenticating a user of the first communication device using personal data or metadata indicative thereof that are stored on the first communications device and received by the cloud service with the meeting information.

3. The method of claim 1, further comprising a step of using the first communication device, performing a gesture to adjust a function parameter of one or more of the second communication device and a peripheral device coupled to the second communication device.

4. The method of claim 3, wherein the function parameter is selected from the group consisting of: initiating another communication, muting the electronic communication, unmuting the electronic communication, adjusting display settings, adjusting a speaker volume of the second communication device, adjusting a speaker volume of the peripheral device, pushing content to the peripheral device, and annotating content displayed on the peripheral device.

5. The method of claim 1, wherein a set of available function parameters that can be manipulated using the first communication device is determined based on a distance between the first communication device and the second communication device.

6. The method of claim 1, further comprising a step of registering the first communication device.

7. The method of claim 6, wherein the step of registering the first communication device comprises entering user information.

8. The method of claim 1, wherein the application automatically launches when the first communication device receives a signal from the second communication device.

9. The method of claim 8, wherein the signal comprises a short range communication protocol, an NFC communication signal, infrared signal, ultrasound signal, or 6LowPAN.

10. The method of claim 1, wherein the second communication device is coupled to one or more peripheral devices.

11. The method of claim 10, wherein after the second communication device is connected to the electronic communication, the second communication device automatically communicates with the one or more peripheral devices.

12. The method of claim 1, wherein the electronic communication comprises a collaboration session.

13. The method of claim 1, further comprising a step of manipulating content on the one or more peripheral devices using the first communication device or a gesture.

14. The method of claim 1, wherein non-authenticated communication devices are connected to the electronic communication.

15. An electronic communication system comprising:
a first communication device having an application stored thereon; and
a second communication device capable of detecting a presence of the first communication device,
wherein, after the second communication device determines the presence of the first communication device, the second communication device automatically sends a signal to the first communication device,
wherein, upon receiving the signal, the first communication device sends a meeting information to a cloud service, the meeting information allows the cloud service to send the second communication device a request to join an electronic communication, and
wherein the cloud service sends the second communication device the request to join the electronic communication using the meeting information and initiates the electronic communication with the first communication device and the second communication device.

16. The electronic communication system of claim 15, wherein the second communication device comprises a conference hub.

17. The electronic communication system of claim 15, further comprising a server coupled to the second communication device.

18. The electronic communication system of claim 17, wherein the server authenticates a user of the first communication device and initiates the electronic communication.

19. An electronic communication method comprising the steps of:
providing a first communication device having an application stored thereon;
providing a second communication device;
using the second communication device, determining a presence of the first communication device;
based on the step of determining the presence of the first communication device, automatically sending a signal from the second communication device to the first communication device;
upon receiving the signal from the second communication device, causing the first communication device to send a meeting information including the location of the first communication device and/or identification of the second communication device directly to a cloud service, the meeting information allows the cloud service to send the second communication device a request to join an electronic communication;
using the cloud service, (i) connecting the first communication device to the electronic communication, (ii) sending the second communication device the request to join the electronic communication, and (iii) connecting the second communication device to the electronic communication; and
performing a gesture to adjust a function parameter of one or more peripheral devices coupled to the second communication device.

20. The method of claim 19, further comprising a step of authenticating a user using the first communication device.

* * * * *